March 5, 1963  A. I. APPLETON  3,080,084
BAR HANGER BOX CLAMP
Filed Dec. 23, 1959
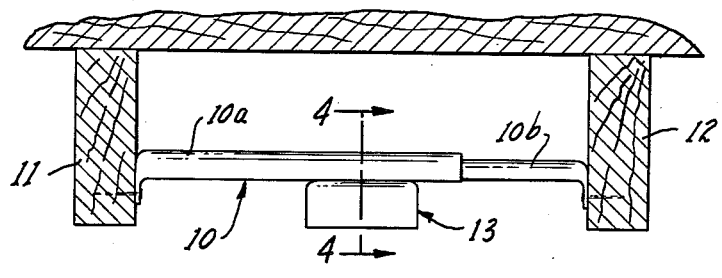
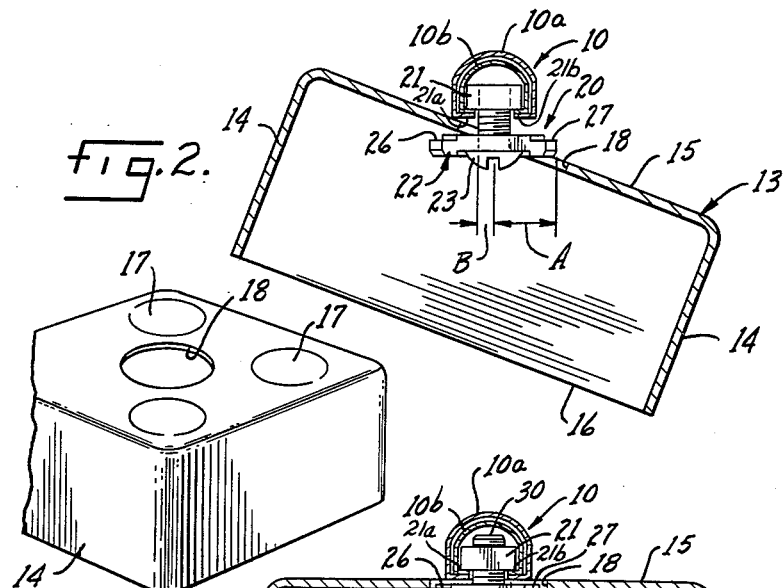
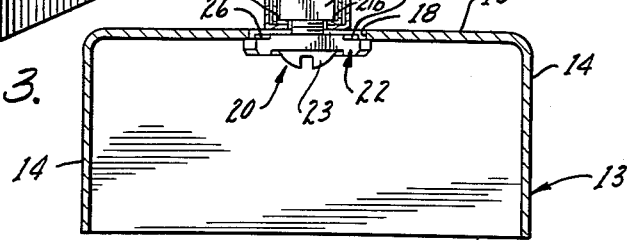
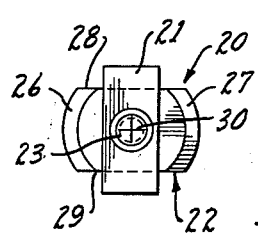
INVENTOR.
Arthur I. Appleton,
BY
Wolfe, Hubbard, Voit & Osann
Attorneys.

United States Patent Office 3,080,084
Patented Mar. 5, 1963

3,080,084
BAR HANGER BOX CLAMP
Arthur I. Appleton, Appleton Electric Co.,
1713 Wellington Ave., Northbrook 13, Ill.
Filed Dec. 23, 1959, Ser. No. 861,470
2 Claims. (Cl. 220—3.9)

This invention relates to an outlet box assembly and more particularly to a box clamp for fastening an outlet box to a bar hanger.

It is an object of this invention to provide a novel box clamp which facilitates the fastening of an electrical outlet box to a bar hanger by making the operation simple and rapid.

Another object of this invention is to provide a bar hanger box clamp of the above type which can be easily and conveniently installed or removed. In more detail, it is an object to provide a clamp of the above character having a single screw that, when tightened with the clamp properly seated, establishes a firm holding force keeping the outlet box permanently locked in the desired position on the bar hanger.

Further, it is an object of this invention to provide a bar hanger box clamp of the above type made up of several parts which cannot be inadvertently disassembled during installation.

It is also an object of this invention to provide a device for attaching an electrical outlet box to a bar hanger that is economical to manufacture and well suited for mass production.

Other objects and advantages of the invention will become apparent upon reading the following detailed description and upon reference to the drawings in which:

FIGURE 1 is an elevation of a bar hanger mounted between adjacent joists with an outlet box affixed to the bar hanger;

FIG. 2 is an enlarged section taken approximately along line 4—4 in FIG. 1 but with the outlet box released so as to show a clamp embodying the invention in its initial position;

FIG. 3 is an enlarged perspective of a fragment of the outlet box;

FIG. 4 is an enlarged section taken along line 4—4 in FIG. 1 showing the outlet box secured to the bar hanger; and FIG. 5 is a plan of the box clamp shown in FIGS. 2 and 4 as seen from the top in those figures.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown a bar hanger 10 mounted between a pair of joists 11 and 12 as are commonly used for framing members in building construction. The illustrated bar hanger is composed of two interfitted channel pieces 10a and 10b telescoped together, with the piece 10b being slidably received within the slightly larger channel formed by the piece 10a. The bar hanger 10 is thus adjustable in length so as to fit between joists or other framing members set varying distances apart.

Mounted on the bar hanger 10 is an outlet box 13 adapted to serve as an enclosure for a wire junction, an anchor for a fixture, or other usual function. The outlet box 13 shown herein is of the conventional "square" type having four sides 14, a back 15 and an open front or face 16. The sides and back of the box are formed with knockout elements 17 which may be dislodged to provide access openings to the box, and an additional mounting opening 18 is formed in the back 15 of the box.

In accordance with the invention, the outlet box 13 is secured to the hanger bar 10 by a box clamp 20 of novel construction which locks the outlet box against lateral or tilting movement at any desired point along the hanger bar 10. In the preferred embodiment, the box clamp 20 includes an anchor piece 21 and a clamping member 22 threadably connected by a screw 23. In the illustrated construction the screw 23 passes through the clamping member 22 and is threaded into the anchor piece 21 so that rotation of the screw draws the clamping member and the clamping member together.

The anchor piece 21 is elongated in shape, as can be best seen in FIG. 5, and is slidably fitted within the channels formed by the bar hanger pieces 10a and 10b. Therefore, the anchor piece, and thus the clamp 20, is freely slidable along the bar hanger on facing inturned lips 21a, 21b and can be positioned at any desired location. The elongated shape of the anchor piece locks it against rotation within the channel defined by the hanger bar 10, and thus enables the screw 23 to be rotated so as to draw the clamping member 22 solidly against the outlet box.

The clamping member 22 is a symmetrical about the screw 23 and is formed with opposed shoulder portions 26 and 27 configured to fit within opposite edges of the outlet box mounting opening 18. In the preferred design, the mounting opening 18 is circular and thus the shoulder portions 26, 27 are arcuate in form.

To lock the outlet box 13 on the bar hanger 10, the mounting opening 18 in the outlet box is slipped over the clamping member 22 and the opposite edges of the mounting opening are rested on the shoulder portions 26, 27 of the clamping member. The screw 23 is then tightened so as to draw the anchor piece 21 and the clamping member 22 together, sandwiching the box therebetween with the outlet box 13 being clamped tightly against the hanger bar. The shoulder portions 26, 27 fit into the opening 18 and prevent the box from moving laterally, and the clamping engagement between the member 22 and the hanger bar prevents the box from tilting.

As a feature of the invention, the box clamp 20 is formed so that the outlet box can be easily slipped over the clamping member 22 into mounting position. For this purpose, the sides 28 and 29 of the clamping member 22 are flattened so that the width of the clamping member is less than the diameter of the mounting opening 18. Also, a particular ratio is established between the length of the clamping member 22, the radius of the screw 23 and the diameter of the opening 18. The ratio which is desirably established is that the sum of one half the length of the symmetrical clamping member 22, distance A shown in FIG. 2 and the radius of the screw 23, distance B, is less than the breadth of the mounting opening 18. Because of the construction, the outlet box can be tilted as shown in FIG. 2 and moved so that the mounting opening 18 hooks over one end of the clamping member 22. Since the sum of the distances A and B is less than the diameter of the opening 18, it will be appreciated that the outlet box 13 can be simply slipped over the clamping member and returned to a normally horizontal position with the edges of the opening 18 resting on the shoulder portions 26, 27 of the clamping member.

As will be apparent, if a non-symmetrical clamping member is utilized, that is one with the screw opening set closer to one end than the other, then the distance A in the above ratio should be the distance from the center of the screw to the closest end of the member.

In order to prevent accidental separation of the parts either during shipment or installation, the screw 23 has its end staked or otherwise upset at 30 so that it cannot be released from the anchor piece 21. It can thus be seen that the parts of the box clamp 20 will not separate once assembled, and that upon mounting, the anchor piece 21 within the channels defined by the bar hanger pieces 10a, 10b the clamp cannot be disassociated from the bar hanger.

As a result of this locked-together construction, it will be understood that the outlet box 13 can be mounted on the hanger bar 10 virtually without close visual attention. The person installing the outlet box simply hooks the opening 18 over the clamping member 22 so that the outlet box remains suspended on the shoulder portions 26, 27 of the clamping member. The outlet box and box clamp 20 are then slid along the bar hanger to the desired box location whereupon the screw 23 is tightened to lock the box in place.

Those skilled in the art will appreciate that the components making up the box clamp 20 can be readily and easily produced by mass production techniques and hence that manufacture of the box clamp 20 is quite economical. Because of the unique locking action of the shoulder portions 26, 27, only a single clamp is required to mount an outlet box in place. The speed and ease of installation results in further economies through the use of the invention.

I claim as my invention:

1. An outlet box assembly, comprising, in combination, a hanger bar adapted to be secured between spaced framing members, said hanger bar having facing inturned lips and defining an elongated channel, an elongated anchor piece slidably carried on said inturned lips within said channel and held against rotation therein, an outlet box having a back formed with an opening therethrough, a relatively thin planar clamping member with two sides and opposite ends having shoulders for sandwiching said outlet box back against said hanger bar, said sides being spaced apart less than the breadth of said opening, and a screw passed through said clamping member into threadable engagement with said anchor piece, said screw having an upset end to protect against accidental removal from said anchor piece, the radius of said screw plus the distance from the center of the screw to the closest clamping end being less than the breadth of said opening, said clamping member shaped in respect of said outlet box opening to allow removal of said outlet box upon tilting and sliding movement of said outlet box relative to said clamping member without disengagement of said screw from said anchor piece.

2. An outlet box assembly comprising, in combination, a hanger bar adapted to be secured between spaced framing members, said hanger bar having facing inturned lips and defining an elongated channel, an elongated anchor piece slidably carried on said inturned lips within said channel and held against rotation therein, an outlet box having a back formed with an opening therethrough, a generally flat planar clamping member sandwiching said outlet box back against said hanger bar and having opposite ends, said clamping member having oppositely facing shoulder portions fitted within said opening in the back of the outlet box to provide a seat holding the outlet box from lateral sliding movement on said clamp, and a screw passed through said clamping member into threadable engagement with said anchor piece, said screw having an upset end to protect against accidental removal from said anchor piece, the radius of said screw plus the distance from the center of the screw to the closest clamping member end being less than the breadth of said opening, said clamping member shaped in respect of said outlet box opening to allow removal of said outlet box upon loosening of said screw and tilting and sliding said outlet box relative to said clamping member.

References Cited in the file of this patent

UNITED STATES PATENTS

| | | |
|---|---|---|
| 1,699,414 | Weinstein | Jan. 15, 1929 |
| 1,769,379 | Madden | July 1, 1930 |
| 1,789,124 | Wever | Jan. 13, 1931 |
| 2,316,389 | Atkinson | Apr. 13, 1943 |